United States Patent [19]

Teeter

[11] Patent Number: 5,315,900
[45] Date of Patent: May 31, 1994

[54] TRANSMISSION CONTROL LEVER HAVING CRUISE AND ENGINE BRAKE CONTROL

[75] Inventor: Terry E. Teeter, Mattawan, Mich.

[73] Assignee: Eaton Corporation, Cleveland, Ohio

[21] Appl. No.: 991,937

[22] Filed: Dec. 17, 1992

[51] Int. Cl.⁵ .............................................. F16H 59/02
[52] U.S. Cl. ..................................... 477/165; 123/322; 200/52 R
[58] Field of Search ................. 74/879; 192/4 A, 4 C; 180/333, 336

[56] References Cited

U.S. PATENT DOCUMENTS

| | | | |
|---|---|---|---|
| 1,819,688 | 8/1931 | Moore | 74/879 |
| 1,823,622 | 9/1931 | Mitchell | 74/879 |
| 1,861,394 | 5/1932 | Hoover | 74/879 |
| 3,795,157 | 3/1974 | Campbell et al. | 74/879 |
| 4,109,945 | 8/1978 | Hveem | 180/77 |
| 4,180,713 | 12/1979 | Gonzales | 200/52 R |
| 4,650,046 | 3/1987 | Parsons | 192/34 |
| 4,742,806 | 5/1988 | Tart, Jr. et al. | 123/322 |

*Primary Examiner*—Dirk Wright
*Attorney, Agent, or Firm*—A. E. Chrow

[57] ABSTRACT

A motor vehicle transmission control lever (2) is provided that carries switch means for controlling a system for braking the vehicle's engine or in combination: (i) switch means for controlling a cruise control system and (ii) switch means for controlling a system for braking the vehicle's engine. The switch means for controlling the cruise control system and the engine braking system are preferably mounted on a housing (10) secured to a handle or knob (6) that is secured to transmission control lever (2) for convenient operation by the operator.

3 Claims, 1 Drawing Sheet

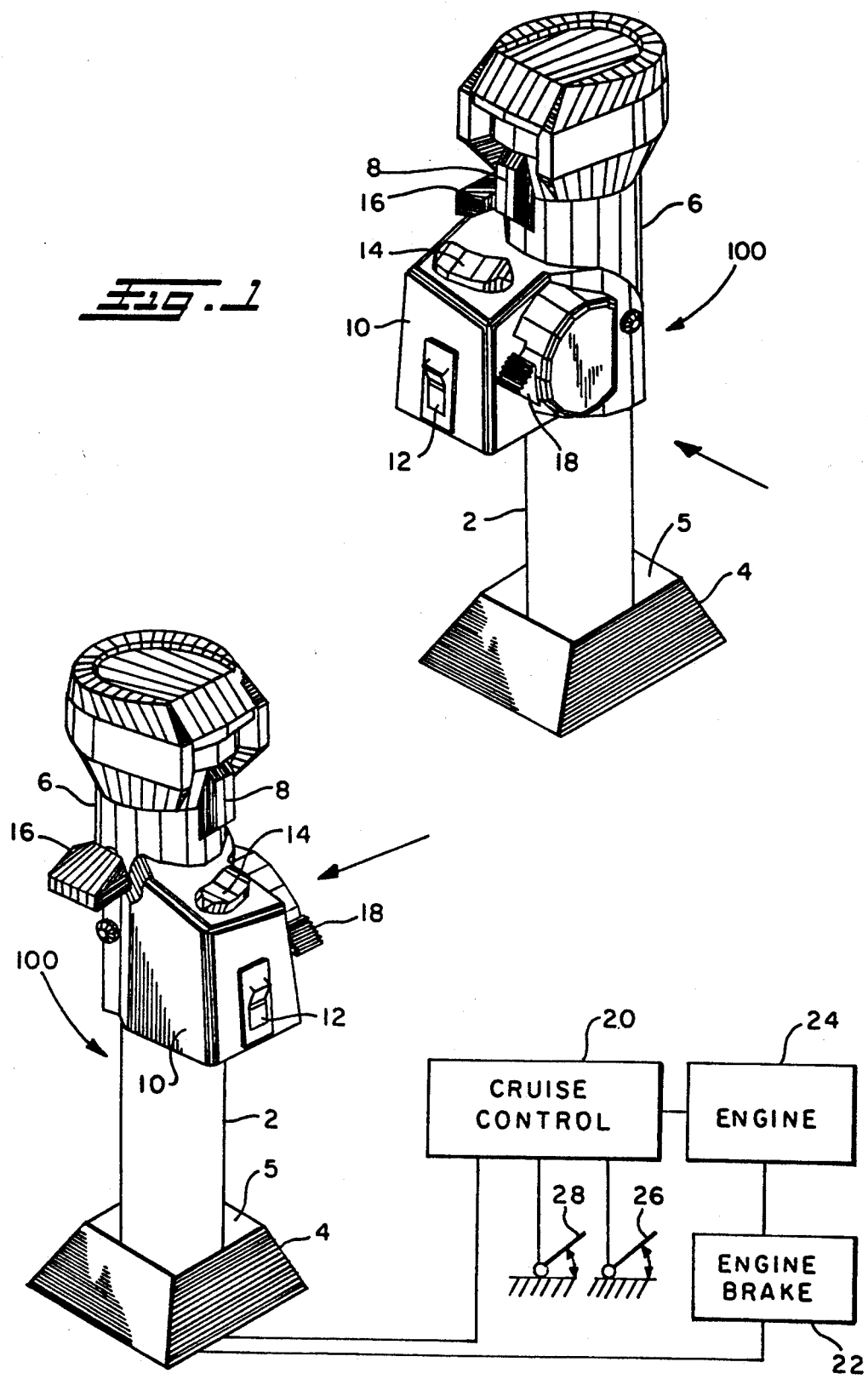

5,315,900

TRANSMISSION CONTROL LEVER HAVING CRUISE AND ENGINE BRAKE CONTROL

INTRODUCTION

This invention relates generally to motor vehicle cruise and engine braking control systems and more particularly to motor vehicle cruise control and engine braking systems whose functions are controlled by manually operated switches carried by the vehicle's transmission control (shift) lever for convenient operation by the operator.

BACKGROUND OF THE INVENTION

Motor vehicle cruise control systems for maintaining a selected vehicle speed and various engine braking systems for braking a vehicle's engine have been known for many years. Cruise control systems characteristically feature manually operated switches for activating or turning the cruise control system on and off and for selecting the vehicle speed to be maintained and for resuming maintenance of the selected vehicle speed after occurrence of an event that momentarily suspends the cruise control function such as by releasing the clutch or applying the brakes which are activities that commonly do not deactivate the control system and enable the suspension to occur without having to reset an already selected vehicle speed and enable resumption of the already selected vehicle speed by means of switch activation.

Various systems have been employed to brake a vehicle's engine ordinarily as a means for assisting conventional wheel brakes. Such braking systems have been used for example to assist in braking while the vehicle is descending a hill.

One example of an engine braking system is known in the trade as the "Jacobs Engine Braking System" a system that, via engine valve control, releases compressed air involved in the ignition process in the combustion chamber, characteristically by cylinders in pairs, to suppress ignition and the energy required to return the pistons to their bottom positions is then derived from the vehicle's momentum which is highly effective in slowing the vehicle.

Another example of an engine braking system is where engine oil is directed into a turbine that acts as a hydraulic brake against the engine's flywheel afterwhich the oil is directed to a location for cooling.

Yet, another simple example of an engine braking system is one that employs a valve located in the engine's exhaust pipe that, when activated, closes off exhaust gas flow to increase exhaust gas content in the engine's cylinders that, in turn, suppresses ignition and causes the engine to act as an air compressor.

Still another example of an engine braking system is one that features stationary friction plates that are urged by fluid pressure against rotary friction plates secured to one of the vehicle's drive line shafts, commonly the transmission output shaft, to frictionally slow vehicle speed to enable down shifting to occur or, in some instances, to assist in preventing roll back during shifting when the vehicle is on a hill or to aid in braking as the vehicle travels down a hill. A characteristic example of a fluid operated friction plate type engine braking system is disclosed in U.S. Pat. No. 4,650,046, the disclosure of which is incorporated herein by reference.

As used herein the term "engine braking system" includes any system manually operable by switches that operates to brake the vehicle whether at the engine location or at some point in the vehicle's drive train as a separate function from the vehicle's wheel brakes so as to assist the wheel brakes for example in braking while descending a hill as previously described.

Cruise control systems are also known to include switches for causing the vehicle's motor to accelerate vehicle speed up to that selected for maintenance and also to accelerate therefrom to some desired higher speed setting and to decelerate therefrom to some desired lower speed setting.

Heretofore, manually operated engine braking system switches have been located on the floor or dashboard and the manually operated cruise control switches have been located either on the dash board or on the steering wheel or on the turn signal arm all of which locations may be convenient to some and inconvenient to others.

A location for the cruise control and engine brake switches heretofore overlooked that is ergonomically convenient to most is the transmission control lever which most operators, if not all, find comfortable to reach without being unduly distracted from viewing the highway ahead.

There have been a few examples in the past where the accelerator pedal control function has been transferred to the transmission control lever by means of connecting cables or rods such as disclosed in U.S. Pat. Nos. 1,819,688; 1,823,633; 1,861,394; 3,795,157 and 4,109,745, the disclosures of which are incorporated herein by reference. However, no one heretofore had thought to transfer location of the engine brake operating switch singularly or the combination of the cruise control and engine braking switches to the transmission control lever.

SUMMARY OF THE INVENTION

Accordingly, it is the object of this invention to provide a motor vehicle transmission control lever that carries switches for operating both a cruise control system and switches for operating an engine braking system or singularly for operating an engine braking system.

BRIEF DESCRIPTION OF THE DRAWINGS

FIG. 1 is a perspective view of an embodiment of the transmission control lever of the invention referenced by numeral 100; and FIG. 2 is a another perspective view of the transmission control lever 100 of FIG. 1 showing, in block diagram, its connection to the cruise control and engine braking systems.

DESCRIPTION OF SOME PREFERRED EMBODIMENTS

Transmission control lever 100 of FIGS. 1 and 2 has an arm 2 that extends from a handle 6 secured to an end of arm 2 through an opening 5 in a protective boot or skirt 4 for operative connection to the vehicle's transmission (not shown). The direction of the arrow shown in FIGS. 1 and 2 is towards the front of the vehicle which, for illustrative purposes, enables a person to conveniently operate the switches with the thumb on their right hand.

Handle or knob 6 carries a plurality of switch means preferably mounted on a housing referenced by numeral 10 in FIG. 1 and all of which are hereinafter described in greater detail with respect to both FIGS. 1 and 2.

Handle 6 may include means for controlling other functions such as the release button as referenced by numeral 8 that, when activated, releases a detent or the like to enable the operator to manually move lever arm 2 or it may include means for operating a range shift air valve or splitter for shifting truck range shiftable splitter type transmissions.

The cruise control switch means carried by transmission control lever 100 are operative to control a cruise control system 20 (shown in FIG. 2) that is operatively connected to an engine 24 (shown in FIG. 2) in a manner effective to control the speed thereof and thus the speed of the vehicle according to the manner in which the switch means on handle 6 are actuated by the operator.

Likewise, the engine braking switch means carried by transmission control lever 100 is operative to brake the engine according to the particular setting selected by the operator.

The configuration of handle 6 shown in FIG. 1 is for illustrative purposes only for it can have any shape such as a knob and the like that is suitable for gripping by an operator during the ordinary course of driving and selecting gears of a vehicular transmission.

Likewise, although the plurality of switch means are shown in a particular arrangement in FIG. 1, they may be arranged in any pattern suitable for manual operation by the operator. The switch means likewise may be toggle, rocker, rotary, push or slide type switches or combinations thereof. When appropriate, more than one operation may be controlled by one or more of the switches.

Transmission control lever 100 can be utilized to select gears of vehicles having manual, automatic and semi-automatic transmissions as is well known in the art. The gear selection sequence may be illustrated on the handle in combination with the cruise control and engine brake switch means or in some other location capable of being viewed by the operator during operation of the vehicle.

Housing 10 shown in the FIGURES is just one of numerous ways that the cruise control and engine brake switch means are carried by transmission control lever 2 for they may, for example, be integrated into the control lever itself or into the control lever handle. Preferably, however, the cruise control and engine brake switch means are mounted on a housing 10 that is secured to or integral with the control lever handle such as handle 6 that in turn is secured to lever 2.

The functions of the various switches in FIGS. 1 and 2 are described as follows.

The cruise control "Off-On" switch referenced by numeral 12 in FIGS. 1 and 2 is preferably a two position rocker type switch.

Switch 14 is preferably a three position rocker type switch that enables operation of the "Set/Decel-Resume/Accel" functions of the cruise control system. Preferably, the extreme positions of switch 14 are momentary hold positions with automatic spring return to the center position.

More particularly, holding switch 14 momentarily at the "Set-Decel" position will set the cruise control speed at a particular vehicle speed desired. Maintaining switch 14 at the "Set/Decel" position will decelerate the vehicle speed until released and the vehicle speed at the time of release will be the new "Set" speed.

Holding switch 14 momentarily at the "Resume/Accel" position will cause the cruise control to resume its "Set" speed after it has been interrupted such as by depressing the vehicle wheel brake pedal referenced by numeral 26 in FIG. 2 or by depressing the vehicle clutch pedal referenced by numeral 28 in FIG. 2 in cases where the vehicle's transmission employs a manually operated clutch that is operable to interrupt the cruise control function.

Maintaining switch 14 at the "Resume/Accel" position will accelerate the vehicle speed until release and the vehicle speed at the time of release will be the new "Set" speed.

Switch 18 is the switch controlling the engine braking system. Switch 18 includes an "Off" position and at least one "On" selection dependent upon the type of engine brake system involved. For example, in the case of a "Jacobs" type engine brake system, there may be three "On" position selections such as "2", "4" or "6" representing increasing pairs of engine cylinders taking part in the braking action. As shown in FIGS. 1 and 2, switch 18 is preferably a rotary type switch located for convenient operation by the operator's thumb.

Also in FIGS. 1 and 2 are two switches that are not part of the cruise control or engine braking systems. The switches are represented by numerals 8 and 16 and are employed in trucks having range-splitter type transmissions to provide a broad range of gear ratios attractive for truck operation particularly in mountainous terrain.

Switch 8 is, for example, a slide type switch for selecting various gear ratios available from the splitter type transmission and switch 16, for example, is a two position "Low" and "High" range selection switch that provides the particular gear rate desired in combination with the position selected for splitter switch 8 as is well known in the art.

Like the cruise control switches, one or more other types of switches may be used in place of the rotary type switch shown in the FIGURES to actuate the engine braking system in the manner desired.

Likewise, the positional relationship between the cruise control and engine braking switch means shown in the FIGURES is for illustrative purposes only for they may be arranged in any pattern convenient for operation by the operator.

It is also to be understood that the term "cruise control system" as used herein includes cruise control systems in perhaps their most simplest form involving only an "On/Off" switch; a "set" switch; and a "Resume" switch and thus absent the "Decal" (deceleration) and "Accel" (acceleration) functions previously described.

What is claimed is:

1. In a motor vehicle having an engine and a manually operable transmission control lever, in combination; (i) switch means carried by the lever for operating a cruise control system and, (ii) switch means carried by the lever for controlling a system for braking the engine.

2. The transmission control lever of claim 1 wherein the cruise control system includes switch means for accelerating vehicle speed.

3. The transmission control lever of claim 1 or 2 wherein the cruise control system includes switch means for decelerating vehicle speed.

* * * * *